US008266288B2

(12) United States Patent
Banerjee et al.

(10) Patent No.: US 8,266,288 B2
(45) Date of Patent: Sep. 11, 2012

(54) DYNAMIC EXPIRATION OF DOMAIN NAME SERVICE ENTRIES

(75) Inventors: Dwip N. Banerjee, Austin, TX (US);
Prashant A. Paranjape, Karnataka (IN);
Swati Rallapalli, Austin, TX (US);
Patrick T. Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/257,169

(22) Filed: Oct. 23, 2008

(65) Prior Publication Data

US 2010/0106833 A1   Apr. 29, 2010

(51) Int. Cl.
*G06F 15/173* (2006.01)
*G06F 15/16* (2006.01)
(52) U.S. Cl. ........ 709/226; 709/203; 709/217; 709/225; 709/227; 709/229; 709/245
(58) Field of Classification Search .................. 709/203, 709/217, 225, 226, 227, 229, 245
See application file for complete search history.

(56) References Cited

U.S. PATENT DOCUMENTS

| | | | | |
|---|---|---|---|---|
| 6,654,387 | B1 * | 11/2003 | Beser et al. .................. | 370/485 |
| 6,845,400 | B2 * | 1/2005 | Macpherson et al. ........ | 709/245 |
| 6,944,167 | B1 | 9/2005 | McPherson | |
| 7,356,534 | B2 | 4/2008 | Mohammed et al. | |
| 7,725,602 | B2 * | 5/2010 | Liu et al. .................... | 709/245 |
| 2002/0016789 | A1 | 2/2002 | Ong | |
| 2004/0073707 | A1 * | 4/2004 | Dillon .......................... | 709/245 |
| 2005/0204039 | A1 * | 9/2005 | Douglis et al. ............... | 709/225 |
| 2006/0075138 | A1 * | 4/2006 | Borella ........................ | 709/245 |
| 2007/0078986 | A1 * | 4/2007 | Ethier et al. ................. | 709/227 |
| 2008/0068996 | A1 * | 3/2008 | Clave et al. ................ | 370/230.1 |
| 2008/0075218 | A1 * | 3/2008 | Monier et al. ............... | 375/371 |
| 2009/0172035 | A1 * | 7/2009 | Lessing et al. ............ | 707/104.1 |
| 2010/0061236 | A1 * | 3/2010 | Joshi ........................... | 370/231 |
| 2010/0125649 | A1 * | 5/2010 | Day et al. ..................... | 709/219 |
| 2010/0146393 | A1 * | 6/2010 | Land et al. ................... | 715/723 |

OTHER PUBLICATIONS

Author(s): T. Narten, R. Draves, S. Krishnan ; Title: Privacy Extensions for Stateless Address Autoconfiguration in IPv6 ; Item: article; Date: Sep. 2007 ; pp. 1-21 ; Volume-Issue(s): RFC 4941 ; Publisher: IETF ; Location: Internet url: http://www.ietf.org/rfc/rfc4941.txt.
Author(s): S. Thomson, T. Narten, T. Jinmei ; Title: IPv6 Stateless Address Autoconfiguration ; Item: article; Date(s): Sep. 2007 ; Volume-Issue(s): RFC 4862 ; Publisher: IETF ; Location: http://www.ietforg/rfc/rfc4862.txt.
Internet Systems Consortium, Inc.; Feb. 23, 2008; www.isc.org.

* cited by examiner

*Primary Examiner* — Emmanuel L Moise
*Assistant Examiner* — Vitali Korobov
(74) *Attorney, Agent, or Firm* — Robert C. Rolnik; David A. Mims

(57) ABSTRACT

Disclosed is a computer implemented method and computer program product for transmitting a resource record to a requesting computer. An authoritative domain name server receives a DNS query from a requesting computer at a name server. The authoritative domain name server looks up the resource record based on the DNS query, wherein the resource record is associated with an epochal time and a time to live. The authoritative domain name server transmits the resource record response based on the epochal time.

17 Claims, 4 Drawing Sheets

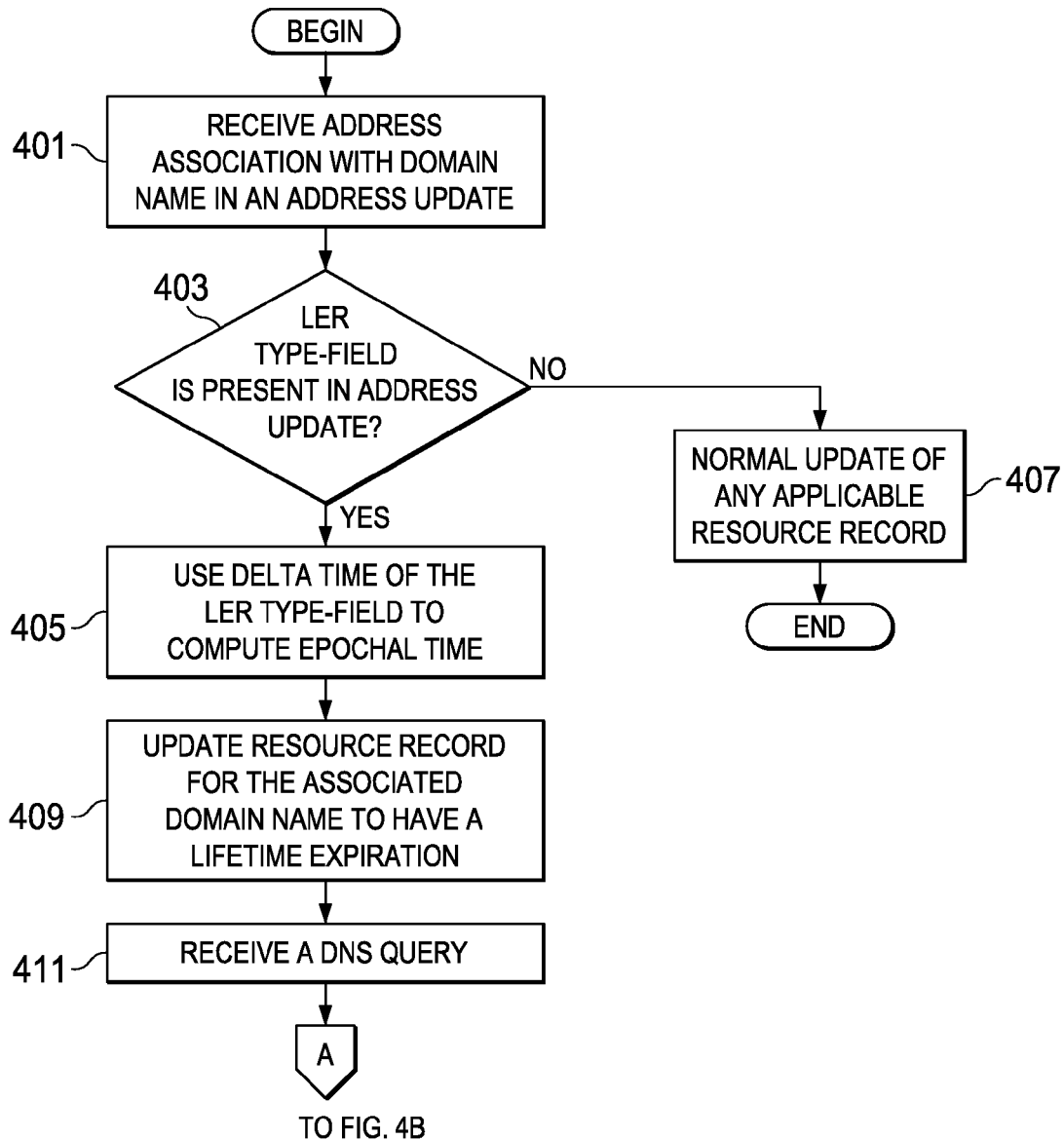

_US 8,266,288 B2_

DYNAMIC EXPIRATION OF DOMAIN NAME SERVICE ENTRIES

BACKGROUND OF THE INVENTION

1. Field of the Invention

The present invention relates generally to a computer implemented method, data processing system, and computer program product for managing a distributed database. More specifically, the present invention relates to responding to domain name service queries and purging a domain name service database of resource records as needed.

2. Description of the Related Art

When computers were first networked together many decades ago, each computer was assigned numeric addresses to identify uniquely to which computer a packet was addressed. Since then, a number of advances have made computers and other networking equipment easier to identify, especially to people. In particular, many server computers have been provided a host name or domain name by which the computers may conveniently be addressed in accordance with a mnemonic scheme established by the creator of the server. Such a mnemonic scheme permits a domain owner to announce and advertise the availability of services on its computer or computers in simple domain names or hostnames, for example, ibm.com or illinois.edu. A hostname refers to a domain name that has one or more associated IP addresses. For example, the 'www.example.com' and 'example.com' domains are both hostnames, however, the 'com' domain is not. A domain name is a sequence of labels separated by dots, for example, '.'. The labels may be established by a centralized naming authority such as, Internet Corporation for Assigned Names and Numbers (ICANN) or its delegates.

The above system using handy names has been preferred in conversation, man-machine interaction, and other processes involving people, as compared to the more cumbersome Internet Protocol Version 4 (IPv4) address of the form, for example, 192.168.0.1. The IPv4 and newer IPv6 both provide IP addresses to an organization that are comprised of numbers, and typically, in batches that are assigned in series. Accordingly, this scheme can be more cumbersome for people to remember the address associated with an organization. Fortunately, the domain name system is a world-wide distributed database that permits an association between the internet protocol (IP) address and the corresponding domain name.

Organizations can change the IP address that services a domain. Such changes make older IP address to domain name associations obsolete. A system created to purge obsolete or otherwise expired IP address to domain associations from the domain name service (DNS) system is desirable.

SUMMARY OF THE INVENTION

The present invention provides a computer implemented method and computer program product for transmitting a resource record to a requesting computer. An authoritative domain name server receives a domain name service (DNS) query from a requesting computer at a name server. The authoritative domain name server looks up the resource record based on the DNS query, wherein the resource record is associated with an epochal time and a time to live. The authoritative domain name server transmits the resource record response based on the epochal time.

One or more embodiments provide a name server implemented method for maintaining a domain name service database. An authoritative domain name server receives an address update associated with a domain name, the address association having a lifetime expiration record and at least one time to live. The authoritative domain name server calculates an epochal time associated with lifetime expiration record. The authoritative domain name server stores the epochal time and at least one time to live with a domain name as a resource record.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B are flowcharts of steps performed by the authoritative DNS server in response to receiving a DNS query for which it is authoritative in accordance with an illustrative embodiment of the invention.

DETAILED DESCRIPTION OF THE PREFERRED EMBODIMENT

Figure 1:
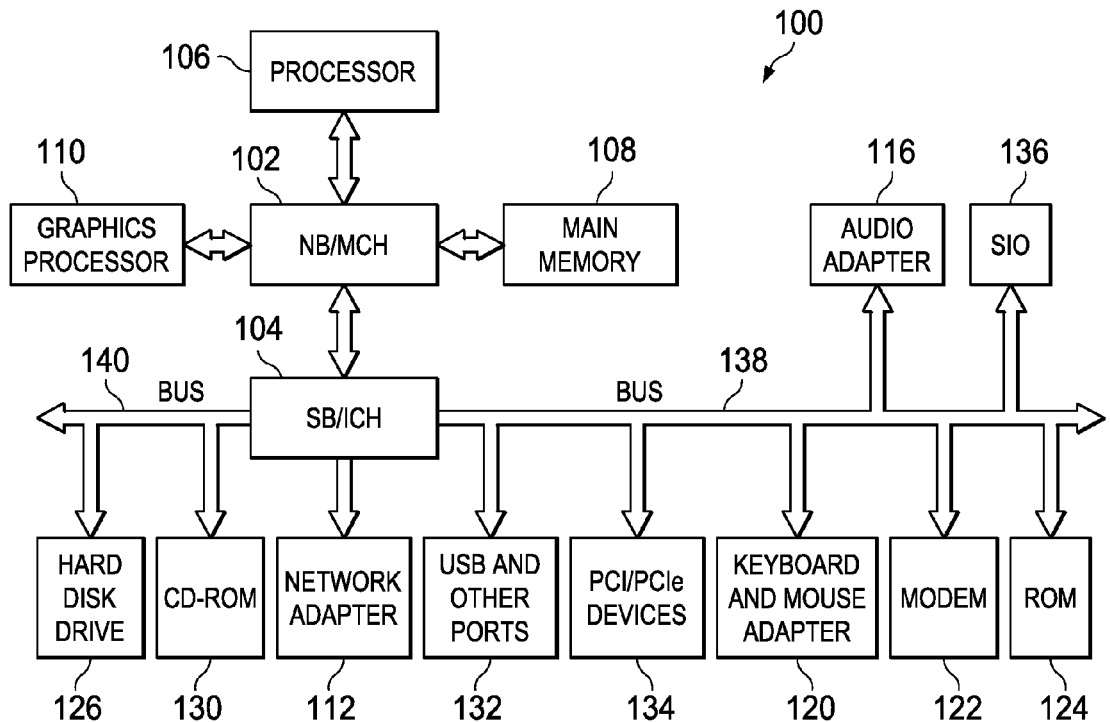
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for updating a domain name service (DNS) authoritative server with a resource record having a known expiration time for a particular IP address. Responsive to locating IP addresses that have expiration dates that have been passed, illustrative embodiments of the invention can delete such resource records that associate an expiration date to an IP address. Similarly, when dispatching responses to DNS queries, an illustrative embodiment may inform the requesting computer to use a time to live that is no greater than the expiration time associated with the IP address provided in the response.

Figure 2:
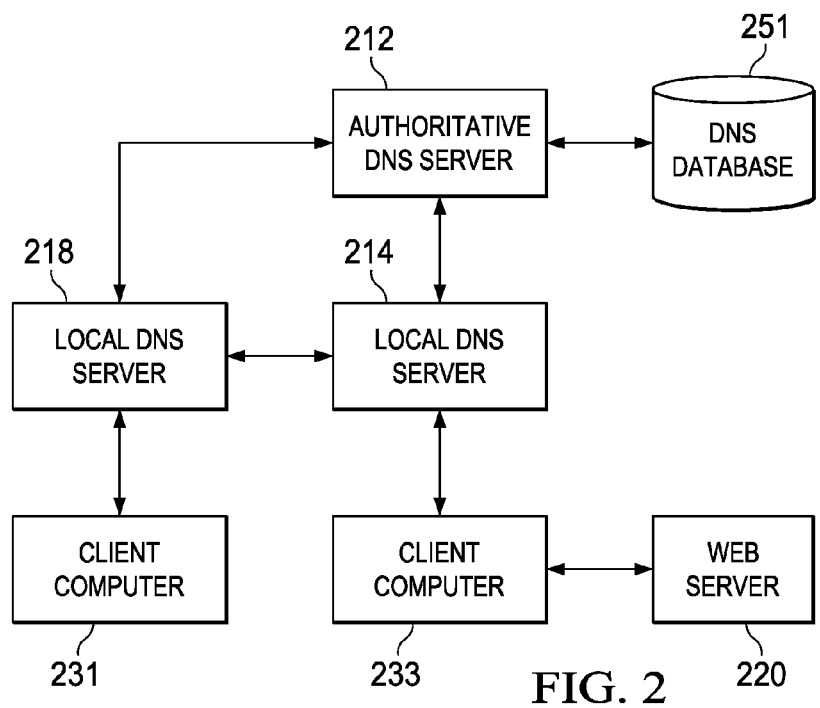
FIG. 2 shows client computers interacting with DNS servers in accordance with an illustrative embodiment of the invention.

FIG. 2 shows client computers interacting with DNS servers in accordance with an illustrative embodiment of the invention. Authoritative DNS server 212 is the server, which is the source for potentially cached resource records. An authoritative name server or authoritative domain name server is a name server that can give an authoritative response or authoritative answer to a DNS query, as explained further with reference to FIG. 3C, below. The authoritative name server does not necessarily cache resource records. The authoritative name server can be a primary server or a secondary server. Authoritative DNS server 212 relies on a DNS database 251. A DNS database of the DNS server is a database of resource records, explained further below. Further information in the DNS database may identify zones for which authority is delegated. A name server or DNS server is a computer that locally accesses a DNS database to obtain matches based on DNS queries, as well as populate the DNS database in response to name server update requests.

Local DNS servers for example, local DNS server 214 and local DNS server 218 may be DNS servers in an hierarchy that can be first requested to provide responses to resolve DNS queries. Accordingly, a client, for example, client computer 231 can make a DNS query to local DNS server 218. A DNS query is a packet sent by a requesting computer to a domain name service (DNS) server that includes a domain name for which the requesting computer requests information about. The DNS query is sent to local DNS server 218 in this case. The client computer, in this case, is a requesting computer. A requesting computer is a computer or other device that requests information about a domain name.

Also shown is client computer 233 attempting to resolve a domain, for example, ibm.com, that is associated with a server, for example, web server 220. Next, local DNS server 214 may forward the DNS query to a server known by local DNS server 214 to be authoritative, namely, authoritative DNS server 212. Authoritative DNS server, in turn, looks up, and resolves the domain name of the DNS query to an IP address. Accordingly, authoritative DNS server 212 transmits a packet containing a resource record to local DNS server 214. Local DNS server may cache the content of the resource record within its own DNS database (not shown). Because local DNS server 214 is not an authoritative name server, local DNS server 214 may cache the resource record.

Next, local DNS server 214 may transmit the response to the DNS query back to client computer 233. A time to live is an indication in a resource record that indicates in a non-authoritative DNS server, that the record should be purged from the server's local cache of resource records. In an authoritative DNS server, the time to live is used to formulate responses to requesting computers in order to limit the time that the resource records are cached in the requesting computer. The system time is a time kept by the local computer that corresponds to the time that the computer is set. In other words, the system time is a time that the computer responds to when queried to indicate the current time.

Accordingly, client computer 233 receives a response that, in many cases, provides an IP address that corresponds with the domain name that the client used in the DNS query. The client may further access resources at a web server 220 using the information contained in the response.

Figure 3A:
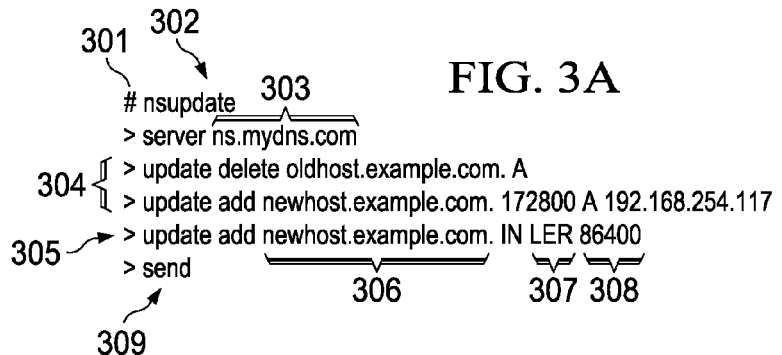
FIG. 3A is a session of user inputs to update an authoritative name server in accordance with an illustrative embodiment of the invention.

FIG. 3A is a session of user inputs to update an authoritative name server in accordance with an illustrative embodiment of the invention. The update may be initiated from client computer 231 of FIG. 2. The update may be directed, for example, to authoritative DNS server 212 of FIG. 2. Command line may include system prompt 301 and nsupdate command 302. 'Nsupdate' is a combination of user interface and communication software that is commonly used to make updates to a name DNS server. The nsupdate session is comprised of an identification of the authoritative name server 303, zero or more conventional delete or add lines 304, and a command to add a lifetime expiration record associated with a domain name 305. The command to add a lifetime expiration record can include domain name 306, indication to establish a lifetime expiration record 307, as well as a lifetime expiration 308. The nsupdate session can conclude with ending line 309, for example, "send". Note, that the nsupdate session described herein, can be a modification or extension of the conventional nsupdate command present in Unix, Linux and other similar operating systems. Linux is a registered trademark of Linus Torvalds in the United States and other countries. For example, syntax of the nsupdate command may be adjusted to allow the transmittal of a lifetime expiration record field-type. The nsupdate command may be used to form and transmit an address update, as explained further in FIGS. 4A and 4B, below.

Figure 3B:
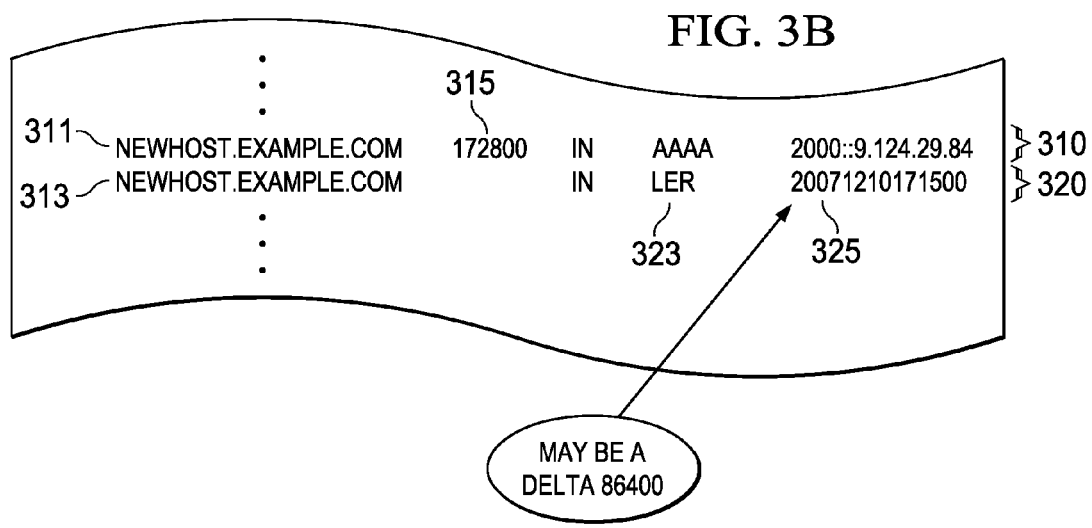
FIG. 3B is an excerpt from a DNS database including resource records in accordance with an illustrative embodiment of the invention.

FIG. 3B is an excerpt from a DNS database including resource records in accordance with an illustrative embodiment of the invention. A resource record is a unit of data in the domain name system. The resource record defines an attribute for a domain name. An attribute can be an internet protocol address, or a time to live, among others. Resource record 310 is comprised of domain name 311, time to live 315, and class. Class may be, for example, Internet class, or 'IN'. A resource record can also include, a type-field, for example, AAAA, as well as a data field. In this case, resource record associates IP address, 2000::9.124.29.84 with domain name, newhost.example.com. In addition, resource record 310 associates a time to live of 172800 with the domain name/IP address association. A time to live (TTL) is a number of seconds that the resource record is allowed to exist in the locally cached DNS database before the resource record is deleted. A DNS server may lookup resource records based on a tuple that includes domain name, type-field and class.

Resource record 320 is a resource record that associates a lifetime expiration record to domain name. Resource record 320 includes domain name 313, IN, a lifetime expiration record type-field 323, and time 325. An illustrative embodiment may use an epochal time depicted as time 325. An epochal time is a time difference or offset from a universally accepted common time. The universally accepted time can be based on any event, for example, a birth or death of a person. Alternatively, the universal time base can be, as used in Unix operating systems, Jan. 1, 1970. The epochal time may indicate years, months, days, hours, minutes and seconds into the era marked by such a universal time base or event. An alternative illustrative embodiment may use a delta time. A delta time may be expressed in seconds by using the time when the application was active. In either embodiment, when transmitting the content of a resource record, the time may be expressed as a delta time, for example, seconds from dispatching the resource record in a message.

A type-field is string or other data used to signal an identity of the resource record as falling within one of a number of distinct classes. The type-field includes classes already in use, as well as the one or more classes described by the illustrative embodiments herein. Conventionally known classes for resource records are internet class (IN) and chaos class (CH). Embodiments can use an additional type-field, for example, "LER". It is appreciated that any unused string other than "LER" may be used for a lifetime expiration record type-field, so long as manufacturers settle on a common standard to designate such a record type.

Figure 3C:
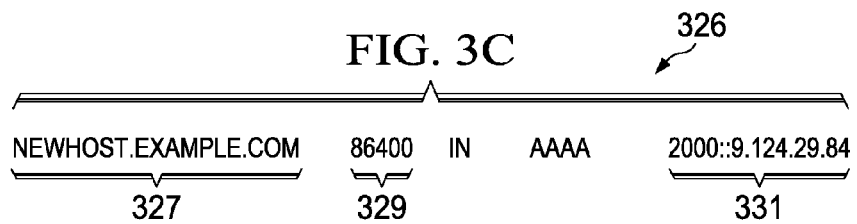
FIG. 3C is a resource record response in accordance with an illustrative embodiment of the invention.

FIG. 3C is a resource record response in accordance with an illustrative embodiment of the invention. A resource record response is one or more packets sent to a requesting computer by the authoritative DNS server. The resource record response may be encoded into one or more packets dispatched to the requesting computer. In this example, the resource record response 326 includes domain name 327, time to live 329, IN, AAAA or "Quad-A", Internet Protocol version 6 (IPv6) address 331. An additional form of resource record response is the NXDOMAIN for the resource record. A NXDOMAIN for the resource record is a status type value returned in a resource record response. Such a NXDOMAIN for the resource record indicates to the requesting computer that a matching resource record is not present. An example of a NXDOMAIN for the resource record or NXDOMAIN error code response is as follows.

HEADER:
   opcode=QUERY, id=10925, rcode=NXDOMAIN
   header flags: response, authoritative answer, want recursion, recursion available
   questions=1, answers=0, authority records=1, additional=0
QUESTIONS:
   foo2.kingwood.foo.com.kingwood.foo.com, type=A, class=IN
AUTHORITY RECORDS:
   →kingwood.foo.com
   type=SOA, class=IN, dlen=48
   ttl=14400 (4H)
   origin=FOOUSQIP.pok.foo.com
   mail addr=dnsxxx.us.foo.com
   serial=2020062211
   refresh=1800 (30M)
   retry=900 (15M)
   expire=604800 (1W)
   minimum ttl=14400 (4H)

Figure 4B:
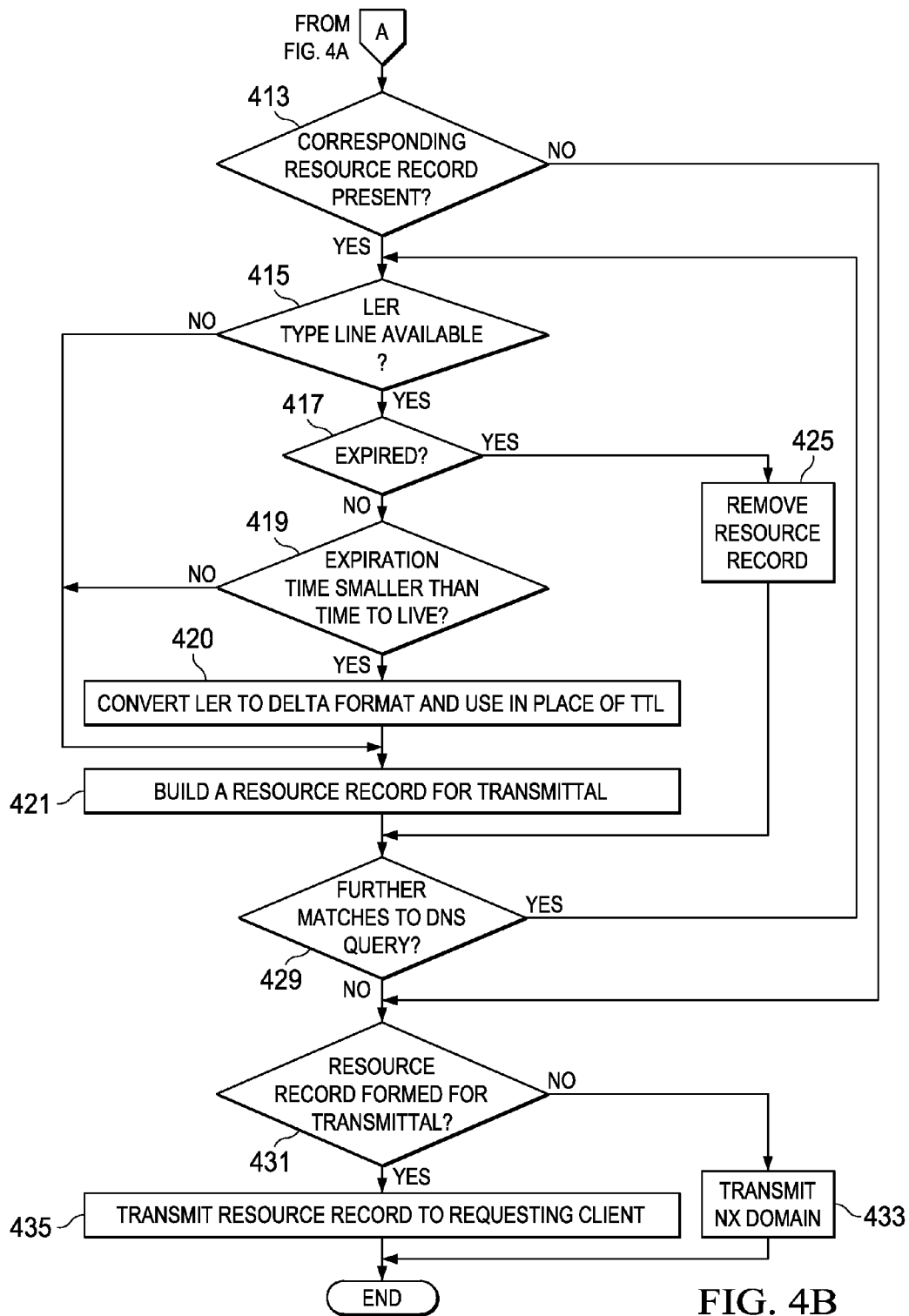

FIGS. 4A and 4B are flowcharts of steps performed by the authoritative DNS server in response to receiving a DNS query for which it is authoritative, in accordance with an illustrative embodiment of the invention. The steps may be substantially performed at authoritative DNS server, for example, authoritative DNS server 251 of FIG. 2. Initially, the authoritative DNS server receives an address association with a domain name in an address update (step 401). An address update may be the user session with a client computer used to collect and validate data for sending to an authoritative DNS server. The address update may be the forming of packets, addressed in accordance with user directive, as well as the transmitting such packets to the authoritative DNS server. Next, the authoritative DNS server determines if a lifetime expiration record (LER) type-field is present in the address update (step 403). An address update can be one or more packets that carry the content of an nsupdate session, as modified herein. If the determination at step 403 is negative, the authoritative DNS server performs a normal update of any applicable resource record (step 407). The normal update of any applicable resource record may be in accordance with, for example, the prior art manner of updating the resource record. Processing terminates thereafter.

However, if the determination at step 403 is positive, the authoritative DNS server uses a delta time present with the lifetime expiration record (LER) type-field to compute an expiration time that is an epochal time (step 405). A delta time is a time after the time that a corresponding communication is sent. Next, the authoritative DNS server updates the resource record, if any, for the associated domain name to have a lifetime expiration (step 409). A lifetime expiration is a time that indicates a threshold that, when approached or surpassed, signals that the associated resource record is obsolete. Next, the authoritative DNS server may receive a DNS query (step 411).

Next, the authoritative DNS server determines if a corresponding resource record is present (step 413). A corresponding resource record is present when the domain name in the DNS query matches one or more domain names of resource record in the DNS database, for example, DNS database 251 of FIG. 2.

A positive determination at step 413 may cause the authoritative DNS server to determine if a lifetime expiration record (LER) is available (step 415). If a LER is available that corresponds to the domain of the DNS query, the authoritative DNS server determines if the lifetime expiration has expired (step 417). If not, the authoritative DNS server determines if the expiration time is smaller than the time to live (step 419). A positive determination at step 419 causes the authoritative DNS server to convert the expiration time to a delta time and use the delta time in place of the time to live (TTL) (step 420). Next, the authoritative DNS server builds a resource record for transmittal (step 421). A resource record for transmittal is a resource record that contains at least an IP address, a domain name, and a time to live. In case of a negative determination at step 419, the authoritative DNS server at step 421, uses the TTL of the original resource record in the DNS database. Otherwise, the authoritative DNS server relies on the TTL generated at step 420. Next, the authoritative DNS server builds a resource record for transmittal (step 421). Step 421 is also performed in response to a negative determination at step 415, wherein the LER type-field is not present in a resource record corresponding to the domain name of the DNS query.

A positive determination to step 417 that a lifetime has expired causes the authoritative DNS server to remove the resource record (step 425). Next, and following step 421, the authoritative DNS server determines whether there are further matches to the DNS query (step 429). A positive determination is similar to a positive outcome to step 413. Accordingly, step 415, and those steps that follow may be repeated in response to a positive determination to step 429.

On the other hand, in response to no corresponding resource record being present at step 413, the authoritative DNS server determines if at least one resource record has been formed for transmittal (step 431). Step 431 is performed with respect to step 421. Accordingly, the determination for step 431 is positive if, during the performance of the flowchart, at least one resource record was built for transmittal, and negative, if during the performance of the flowchart, no resource record was built for transmittal. A negative determination occurs, for example, when the step 413 is a negative determination, and the step 431 follows subsequently.

A negative determination at step 431 causes the authoritative DNS server to transmit a reply with an error code of "NXDOMAIN" to the requesting computer (step 433). Otherwise, the authoritative DNS server transmits the at least one resource record to the requesting computer (step 435). The requesting computer can be, for example, local DNS server 214 of FIG. 2. Processing terminates thereafter.

The illustrative embodiments permit an authoritative DNS server to provide instructions to a DNS server to use a time to live shorter than that present in the authoritative DNS server's DNS database. Accordingly, the DNS server can more promptly purge cached resource records according to an occasionally briefer time to live.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to transmit at least one resource record to a requesting computer, the method comprising:

receiving a first domain name service query from a non-authoritative domain name server at a name server, wherein the non-authoritative domain name server is not the name server;

looking up a first resource record based on the first domain name service query, wherein the first resource record is associated with a lifetime expiration and a time to live;

storing the lifetime expiration as a delta time in place of the time to live in a second resource record, wherein the delta time is shorter than the time to live of the first resource record;

transmitting the second resource record as a response to the non-authoritative domain name server based on the lifetime expiration;

receiving a second domain name service query at the non-authoritative domain name server;

the non-authoritative domain name server looking up the second resource record based on the second domain name service query, wherein the second resource record comprises the delta time in place of the time to live and the second resource record is in a database of the non-authoritative domain name server;

the non-authoritative domain name server determining whether the delta time is expired;

responsive to a determination that the delta time is expired, removing by the non-authoritative domain name server the second resource record from a database of the non-authoritative domain name server; and the non-authoritative domain name server transmitting a NXDOMAIN for the second resource record to a requesting computer.

2. The computer implemented method of claim 1, wherein storing further comprises:

determining whether the delta time is smaller than the lifetime expiration; and responsive to a determination that the delta time is smaller than the lifetime expiration, forming the second resource record using the delta time as a time to live of the second resource record.

3. The computer implemented method of claim 1, wherein transmitting the second resource record further comprises:

determining whether the delta time is expired;

responsive to a determination that the delta time is expired, removing the first resource record from a domain name service database of the name server; and transmitting a NXDOMAIN for the second resource record to the non-authoritative domain name server.

4. The computer implemented method of claim 3, wherein transmitting the NXDOMAIN for the second resource record is responsive to a determination that no further matches are present in the domain name service database of the name server.

5. The computer implemented method of claim 1, wherein looking up the first resource record comprises:

finding the first resource record;

determining whether the delta time is expired;

responsive to a determination that the delta time is expired;

looking up a third resource record based on the domain name service query, wherein the third resource record is associated with a second delta time and a second time to live; and using the third resource record as the first resource record.

6. The computer implemented method of claim 1, wherein transmitting further comprises:

transmitting the second resource record as a response, wherein the second resource record has having an expiration time earlier than the time to live of the first resource record.

7. A computer program product to transmit at least one resource record to a requesting computer, the computer program product comprising:

a computer usable medium selected from the group consisting of a semiconductor medium, a portable computer diskette, a hard disk, a random access memory, a read-only memory, an erasable programmable read-only memory, a portable compact disc read-only memory, an optical storage device, a magnetic storage device having computer usable program code embodied therewith, the computer program product comprising:

computer usable program code configured to receive a first domain name service query from a non-authoritative domain name server at a name server, wherein the non-authoritative domain name server is not the name server;

computer usable program code configured to look up a first resource record based on the first domain name service query, wherein the first resource record is associated with a lifetime expiration and a time to live;

computer usable program code configured to store the lifetime expiration as delta time in place of the time to live in a second resource record, wherein the delta time is shorter than the time to live of the first resource record;

computer usable program code configured to transmit the second resource record as a response to the non-authoritative domain name server based on the lifetime expiration;

computer usable program code configured to receive a second domain name service query at the non-authoritative domain name server;

computer usable program code configured to look up the second resource record based on the second domain name service query, wherein the second resource record comprises the delta time in place of the time to live and the second resource record is in a database of the non-authoritative domain name server;

computer usable program code configured to determine whether the delta time is expired;

computer usable program code configured to remove by the non-authoritative domain name server the second resource record from a database of the non-authoritative domain name server, responsive to a determination that the delta time is expired; and computer usable program code configured transmit to a NXDOMAIN for the second resource record to a requesting computer.

8. The computer program product of claim 7, wherein selecting a smaller of epochal time and time to live to form a resource for transmittal comprises:

computer usable program code configured to determine whether the delta time is smaller than the lifetime expiration; and computer usable program code configured to form the second resource record using the delta time as a time to live of the second resource record for transmittal.

9. The computer program product of claim 7, wherein transmitting the second resource record based on the delta time comprises:

computer usable program code configured to determine whether the delta time is expired;

computer usable program code configured to remove the resource record from a domain name service database of the name server; and computer usable program code configured to transmit a NXDOMAIN for the second resource record to the non-authoritative domain name server.

10. The computer program product of claim 9, wherein transmitting the NXDOMAIN for the second resource record is responsive to a determination that no further matches are present in the domain name service database of the name server.

11. The computer program product of claim 7, wherein computer usable program code configured to look up the first resource record comprises:
- computer usable program code configured to find the first resource record;
- computer usable program code configured to determine whether the delta time is expired;
- computer usable program code configured to look up a third resource record based on the domain name service query, wherein the third resource record is associated with a second delta time and a second time to live; and
- computer usable program code configured to use the third resource record as the first resource record.

12. The computer program product of claim 7, further comprising:
- computer usable program code configured to transmit the second resource record as a response, wherein the second resource record has an expiration time earlier than the time to live of a the first resource record.

13. A name server implemented method for maintaining a domain name service database, the method comprising:
- receiving an address update associated with a domain name, the address update having a lifetime expiration record and an AAAA record, wherein the AAAA record comprises an Internet Protocol (IP) version 6 address, and the lifetime expiration record comprises a lifetime expiration and does not include an Internet Protocol address;
- calculating a delta time associated with the lifetime expiration record based on a delta time present in the address update; and
- storing the delta time and at least one time to live with a domain name as a resource record.

14. The name server implemented method of claim 13, wherein the lifetime expiration is a delta time.

15. The name server implemented method of claim 13, wherein the lifetime expiration record includes a type-field used to signal an identity of the lifetime expiration record as a lifetime expiration record.

16. The name server implemented method of claim 13, wherein the address update has at least one time to live.

17. A data processing system for transmitting at least one resource record to a requesting computer, the data processing system comprising:
- a means for receiving a first domain name service query from a non-authoritative domain name server at a name server, wherein the non-authoritative domain name server is not the name server;
- a means for looking up a first resource record based on the first domain name service query, wherein the first resource record is associated with a lifetime expiration and a time to live;
- a means for storing the lifetime expiration as a delta time in place of the time to live in a second resource record, wherein the delta time is shorter than the time to live of the first resource record;
- a means for transmitting the second resource record as a response to the non-authoritative domain name server based on the lifetime expiration;
- a means for receiving a second domain name service query at the non-authoritative domain name server;
- the non-authoritative domain name server looking up the second resource record based on the second domain name service query, wherein the second resource record comprises the delta time in place of the time to live and the second resource record is in a database of the non-authoritative domain name server;
- the non-authoritative domain name server determining whether the delta time is expired;
- responsive to a determination that the delta time is expired, a means for removing by the non-authoritative domain name server the second resource record from a database of the non-authoritative domain name server; and
- the non-authoritative domain name server transmitting a NXDOMAIN for the second resource record to a requesting computer.

\* \* \* \* \*